(12) United States Patent (10) Patent No.: US 9,330,331 B2
Kasthuri (45) Date of Patent: May 3, 2016

(54) SYSTEMS AND METHODS FOR OFFLINE CHARACTER RECOGNITION

(71) Applicant: Wipro Limited, Bangalore (IN)

(72) Inventor: Magesh Kasthuri, Little Kanchipuram (IN)

(73) Assignee: Wipro Limited, Bangalore (IN)

( * ) Notice: Subject to any disclaimer, the term of this patent is extended or adjusted under 35 U.S.C. 154(b) by 58 days.

(21) Appl. No.: 14/146,213

(22) Filed: Jan. 2, 2014

(65) Prior Publication Data

US 2015/0131912 A1 May 14, 2015

(30) Foreign Application Priority Data

Nov. 11, 2013 (IN) .......................... 5074/CHE/2013

(51) Int. Cl.
*G06K 9/46* (2006.01)
*G06K 9/68* (2006.01)

(52) U.S. Cl.
CPC ............ *G06K 9/4609* (2013.01); *G06K 9/6878* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 5,710,916 A * | 1/1998 | Barbara | ............ G06F 17/30247 |
| 6,011,865 A | 1/2000 | Fujisaki et al. | |
| 8,280,168 B2 | 10/2012 | Napper | |
| 8,391,613 B2 | 3/2013 | Zhu | |
| 2005/0100214 A1 * | 5/2005 | Zhang et al. | ................... 382/179 |
| 2005/0152600 A1 * | 7/2005 | Chen et al. | ..................... 382/187 |
| 2010/0215277 A1 * | 8/2010 | Huntington et al. | .......... 382/218 |
| 2011/0280477 A1 | 11/2011 | Al-Omari et al. | |
| 2012/0251006 A1 | 10/2012 | Zou et al. | |

FOREIGN PATENT DOCUMENTS

| | | |
|---|---|---|
| EP | 1612695 A1 | 1/2006 |
| WO | 9849629 A1 | 11/1998 |
| WO | 00/29978 A1 | 5/2000 |
| WO | 00/33295 A1 | 6/2000 |
| WO | 03/023696 A1 | 3/2003 |
| WO | 2005/096708 A2 | 10/2005 |

OTHER PUBLICATIONS

"OCR-IT LLC, Tips for recognizing multiple languages and processing documents with mixed languages", OCR-IT Team, last accessed, Jan. 2, 2014, pp. 1-2.

* cited by examiner

*Primary Examiner* — Stephen R Koziol
*Assistant Examiner* — Elisa Rice
(74) *Attorney, Agent, or Firm* — LeClairRyan, a Professional Corporation

(57) ABSTRACT

A method, non-transitory computer readable medium and character recognition device for character recognition includes a character recognition device for receiving an image representing a character comprising one or more strokes. A set of first parameters associated with each of the one or more first strokes is determined. Each of the one or more first strokes is compared with the associated set of first parameters with a plurality of stored sets of second parameters, where each of the plurality of stored second strokes is associated with a stored set of second parameters. A second stroke is identified from among the plurality of stored second strokes corresponding to each of the one or more first strokes based on the comparison. The character is identified based on the identified one or more second strokes.

21 Claims, 7 Drawing Sheets

SYSTEMS AND METHODS FOR OFFLINE CHARACTER RECOGNITION

This application claims the benefit of Indian Patent Application Filing Number 5074/CHE/2013, filed on Nov. 11, 2013, which is hereby incorporated by reference in its entirety.

TECHNICAL FIELD

This disclosure relates generally to text recognition, and more particularly to systems and methods for offline character recognition.

BACKGROUND

Handwriting recognition is a widely implemented technology to electronically identify handwritten text. In online handwriting recognition, text written on a touch surface of an electronic touch device is dynamically recognized based on the movements of a writing device (digital pen, a finger, or a stylus) and presented to the user after each continuous stroke such as a character or word is entered. Therefore, the user is able to edit a character or a word in the event of incorrect recognition of text by the electronic device as soon as it is presented to the user. On the other hand, in offline handwriting recognition, recognition of characters occurs by identifying characters from an image of handwritten text instead of the user writing on a touch surface. Here, the recognized text is presented to a user only when the entire handwritten text represented in the image is recognized.

One challenge associated with offline handwriting recognition is that the handwritten text cannot be edited or re-entered by the user until the entire handwritten text is recognized. A user, thus, may not be able to provide a feedback for correction after the recognition of each character or word in case of an incorrect recognition of that character or word. Thus, the errors in the offline handwriting recognition of that handwritten text may keep on accumulating in the absence of user supervision. Therefore, it is desirable to increase the accuracy of recognition of handwritten text in systems that implement offline handwriting recognition.

Another challenge is that various users write in varied handwriting styles and in different languages. Each character in the handwritten text may have been written in multiple handwriting styles by different users. It is desirable that a character be correctly recognized in spite of having been written in varied handwriting styles. In addition, a character in one language may be similar, but not same, to a character of a different language and is, thus, prone to be incorrectly recognized. Therefore, there is need for greater accuracy in offline handwriting recognition of such handwritten text.

SUMMARY

In one embodiment, a character recognition method executed on an electronic device is disclosed, the method comprising: receiving, at the electronic device, an image representing a character including one or more first strokes; determining a set of first parameters associated with each of the one or more first strokes; comparing, for each of the one or more first strokes, the associated set of first parameters with a plurality of stored sets of second parameters, wherein each of the plurality of stored second strokes is associated with a stored set of second parameters; identifying a second stroke, from among the plurality of stored second strokes, corresponding to each of the one or more first strokes based on the comparison; and identifying the character based on the identified one or more second strokes.

A character recognition device is disclosed, comprising: at least one processor; and a memory storing instructions executable by the at least one processor, wherein the instructions configure the at least one processor to: receive an image representing a character including one or more strokes; determine a set of first parameters associated with each of the one or more first strokes; compare, for each of the one or more first strokes, the associated set of first parameters with a plurality of stored sets of second parameters, wherein each of the plurality of stored second strokes is associated with a stored set of second parameters; identify a second stroke, from among the plurality of stored second strokes, corresponding to each of the one or more first strokes based on the comparison; and identify the character based on the identified one or more second strokes.

In one embodiment, a non-transitory computer-readable medium is disclosed, the non-transitory computer-readable medium storing instructions that, when executed by one or more processors, causes the processor to perform operations comprising: receiving, at an electronic device, an image representing a character including one or more first strokes; determining a set of first parameters associated with each of the one or more first strokes; comparing, for each of the one or more first strokes, the associated set of first parameters with a plurality of stored sets of second parameters, wherein each of the plurality of stored second strokes is associated with a stored set of second parameters; identifying a second stroke, from among the plurality of stored second strokes, corresponding to each of the one or more first strokes based on the comparison; and identifying the character based on the identified one or more second strokes.

It is to be understood that both the foregoing general description and the following detailed description are exemplary and explanatory only and are not restrictive of the claimed subject matter.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
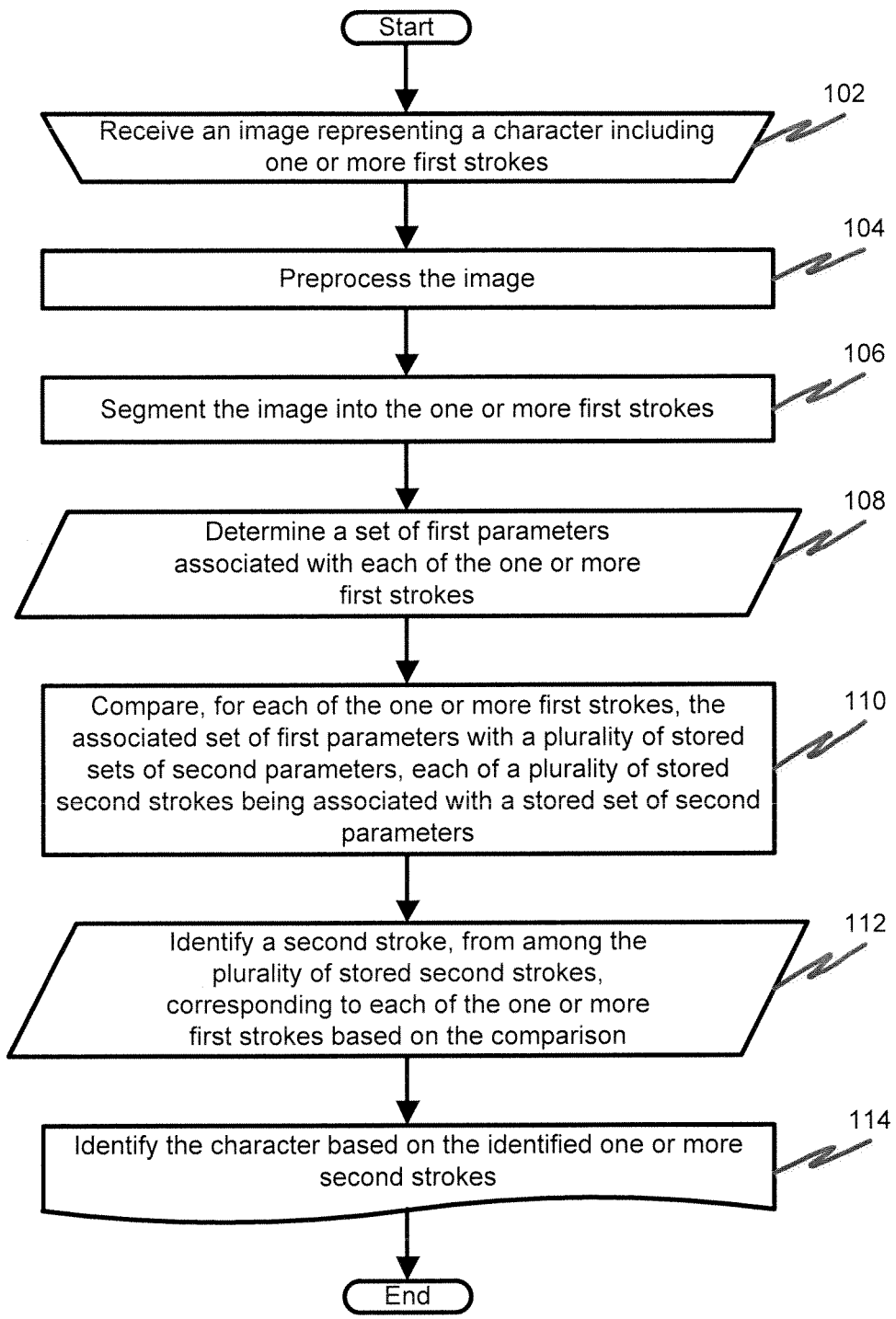
FIG. 1 illustrates a flowchart for offline character recognition in accordance with some embodiments.

FIG. 1 illustrates a flowchart for offline character recognition executed on an electronic device in accordance with some embodiments. In step 102, an image representing a handwritten text is received by an electronic device. The text represented in the received image may be handwritten by a user. Further, the text may include one or more characters. For the purposes of this invention, a character may include an alphabet, a number, a special character, or a symbol that may be used as an elementary unit to represent a written language. Further, a character may include one or more strokes, each stroke representing a portion of the character. One or more groups of characters may form words, sentences, and/or paragraphs that may be expressed in one or more languages such as English, Arabic, Hindi, Urdu, French, Spanish or any other known language that can be expressed in written form. In addition, the handwritten text may have been written by a user in a handwriting style that is specific to the user. Thus, different users may write the text in different handwriting styles, each style being specific to a user.

In some embodiments, the image representing the text may be received by the electronic device by means of scanning a handwritten document. For example, a document may represent a handwritten text in one or more languages. The document may be scanned by a scanner that is communicatively coupled externally to the electronic device or built into the electronic device. On scanning the document, the scanner may capture an image of the document which is further provided to the electronic device. Alternately, such an image may be captured by a camera associated with the electronic device or may be received by the electronic device via, but not limited to, electronic mail, file transfer, facsimile, and uploading on the internet on a server associated with the electronic device. In some embodiments, an image of the text may be provided to the electronic device in the form of an image file format (*.jpeg, *.bmp, *.png, or *.gif format), a portable document format (*.pdf), a hyperText markup language format (*.html), or any other format that may support embedding an image in a file.

In step 104, a processor of the electronic device may preprocess the received image. In some embodiments, the preprocessing may include digitization of the received image. Each pixel of the received image is associated with a pixel value between 0-255. The digitization may include converting the pixel value of each pixel to either a pixel value 0 or a pixel value 1. In some embodiments, the pixel value 0 may be associated with a white pixel and the pixel value 1 may be associated with a black pixel. In some embodiments, the preprocessing may further include removing noise such as, but not limited to, salt and pepper noise and Gaussian noise from the digitized image using one or more noise removal techniques known in the art. In one example a noise reduction technique known as Linear smoothing filters may be applied in which, a mask of smoothing filters may be compared with pixels in the received image to identify potential areas for noise removal. The preprocessing may further include making the width of all the characters in the received image uniform by normalizing the width of each portion of the text to a predetermined value of width. This may include either reducing width of some portions of the handwritten text or increasing their width to the predetermined value of width. The width of a portion may be reduced by converting any undesired black pixels to white if the handwritten text is represented by black pixels. Similarly, the width may be increased by converting some white pixels in the vicinity of the handwritten text to black if the text is represented by black pixels. The normalizing of the width of the text may result in a uniform width across each portion of a character and across all the characters in the received image.

It should be understood, however, that preprocessing of the received image may include additional techniques such as, but not limited to, cropping, resizing, applying one or more filters, and transformation of an image from colored to a grayscale image.

Once the received image is preprocessed, the preprocessed image is segmented into one or more first strokes by the processor, in step 106. On preprocessing the image, the processor of the electronic device may segment the handwritten text in the received image into characters. In some embodiments, the processor may distinguish one component of the text from another component based on spacing between the components. Here, a component may be a set of continuous pixels that includes one or more characters. In some embodiments, a first component including a character may be distinguished from a second component including one or more characters based on whether the spacing between the first and the second components is above a predetermined first threshold. Thus, the processor may distinguish each character from other characters. Once the characters are distinguished from each other, the processor may segment the text into individual characters.

On segmenting the characters, the processor may represent each character in a matrix format that includes a plurality of cells. FIG. 2(*a*) represents an exemplary matrix representation of an English alphabet 'A' as a character 202 on a matrix 204 that includes a plurality of cells 206. Further, the processor may scan matrix 204 to identify one or points on character 202 that represent a sudden change in angle. For purposes of this disclosure, a sudden change in angle may be considered at a point on a character when two linear or non-linear line segments form an angle at that point that is below a predetermined threshold angle. Here, point 208, point 210, and point 212 on character 202 may represent a sudden change in angle along the representation of character 202 because at each of these points, two line segments form an angle that may be considered to be below a predetermined threshold angle. For example, if an angle formed by two line segments at a point is below a predetermined threshold angle of 40°, it may be considered as a sudden change in angle. Once all the points representing a sudden change in angle have been identified, the processor may split character 202 at these points into different strokes as represented in FIGS. 2(*b*), 2(*c*), and 2(*d*), respectively.

For the purposes of this disclosure, segmenting a character into one or more strokes may include splitting a character at points that represent a sudden change of angle in the representation of the character. A stroke may, thus, include a portion of the character that represents a linear or a non-linear line segment connecting two points that represent a sudden change in angle in the representation of the character. For example, a line segment connecting point 208 and 210 of FIG. 2(*a*) may be identified as one stroke of character 202 by the processor. A stroke may also include a line segment connecting a point that represents a sudden change in angle in the representation of the character and an end point of the character. For example, a line segment connecting point 212 and point 214, an end point, may be identified as a second stroke of character 202. In addition, a stroke may include a line segment connecting two end points of a character. For example, an alphabet 'I' that does not have a point representing a sudden change in angle may be identified as a single stroke, which is a line segment connecting two end points of the alphabet 'I'.

For purposes of this disclosure, a stroke is not limited to a continuous line segment. A stroke may also include a portion of a character that has a discontinuity in its representation. For example, an English alphabet 'i' may also be considered as a single stroke according to some embodiments in spite of a discontinuity in its representation because there is no sudden change in angle in any portion of this alphabet.

In step 108, the processor may determine a set of parameters associated with each of the one or more first strokes.

Figure 2A:
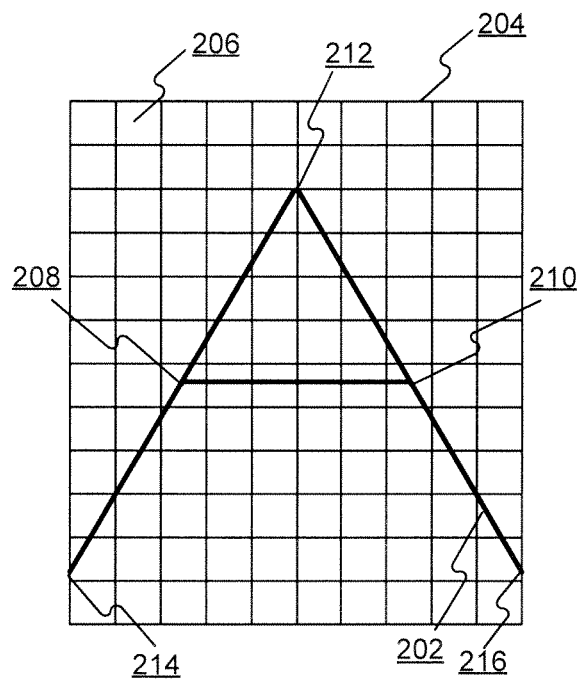
FIGS. 2(a)-2(d) illustrate an exemplary matrix representation of a character and its strokes in accordance with some embodiments.
Figure 2B:
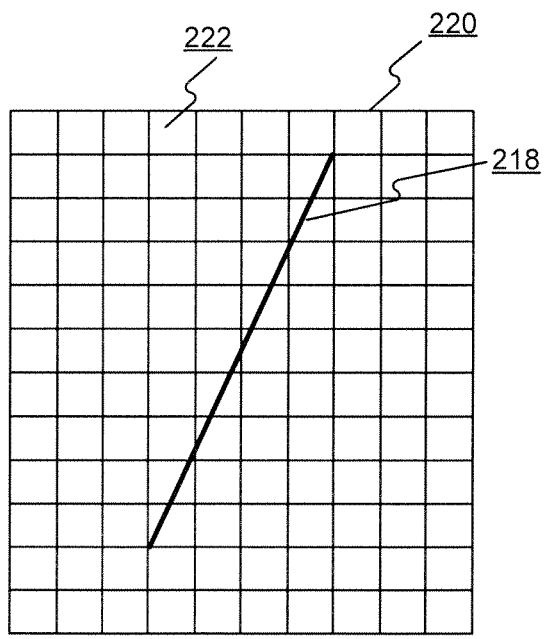
Figure 2C:
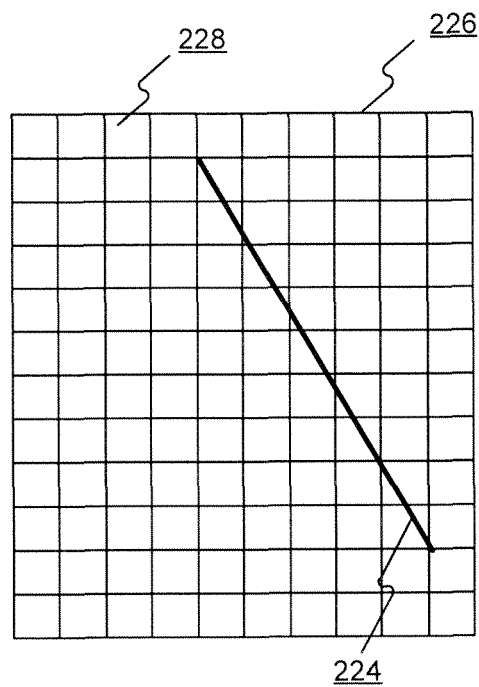
Figure 2D:
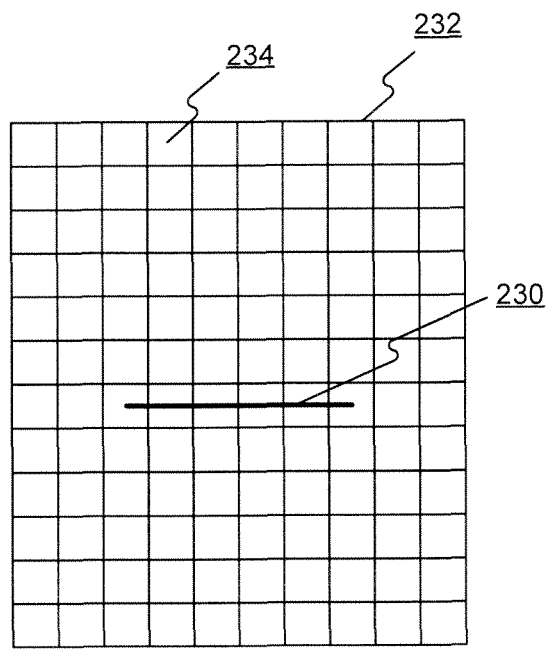

Once the received image is segmented into one or more first strokes by the processor, each stroke may be represented in a matrix format that includes a plurality of cells. In keeping with the example discussed in the context of FIG. 2(a), character 202 may be segmented into 3 strokes as shown in FIGS. 2(b), 2(c), and 2(d). FIG. 2(b) illustrates a stroke 218 that may be represented on a matrix 220 including a plurality of cells 222. In some embodiments, stroke 218 may be equivalent to a line segment of character 202 that connects point 212 and point 214 of FIG. 2(a). Further, in FIG. 2(c), a stroke 224 may be represented on a matrix 226 that includes a plurality of cells 228. Stroke 224 may be equivalent to a line segment of character 202 that connects point 212 and point 216 of FIG. 2(a) Further, in FIG. 2(d), stroke 230 may be represented on a matrix 232 that includes a plurality of cells 234. Stroke 230 may represent a line segment connecting point 208 and point 210 of FIG. 2(a).

Figure 3:
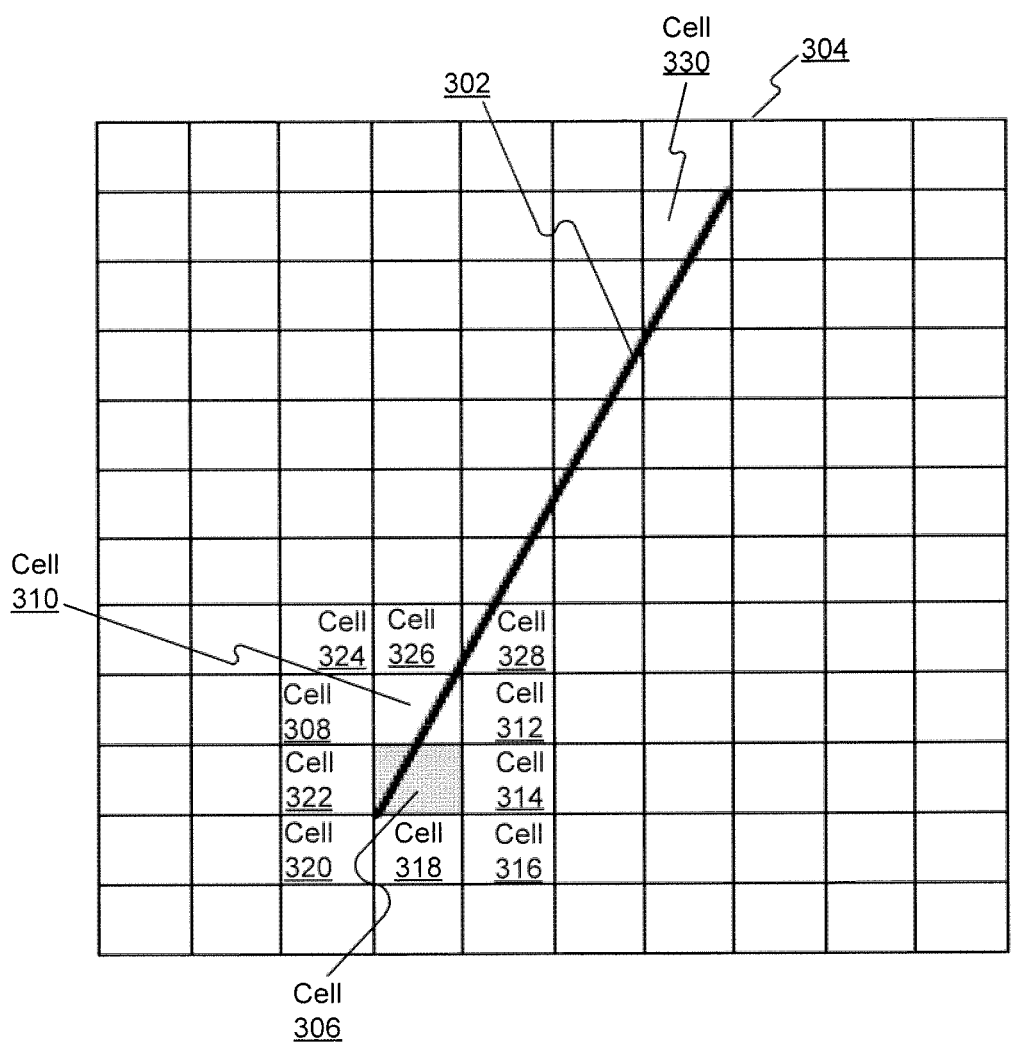
FIG. 3 illustrates an exemplary representation of scanned cells of a matrix in accordance with some embodiments.

Further, in order to determine the set of first parameters associated with a first strokes, the processor may first scan all the cells that represent a portion of that first stroke. In an exemplary scenario, FIG. 3 illustrates a stroke 302 that may be represented on matrix 304 that includes plurality of cells such as cell 306, cell 308, cell 310, cell 312, cell 314, cell 316, cell 318, cell 320, cell 322, cell 324, cell 326, cell 328, cell 330 etc. Stroke 302 may extend from cell 306 to cell 330 as shown in FIG. 3, thereby, spanning multiple cells, each of which may represent a portion of stroke 302. In some embodiments, the processor may scan each of these cells that represent a portion of stroke 302 sequentially to determine one or more parameters associated with a portion of stroke 302 represented in that cell.

In some embodiments, before initiating scanning of the cells representing different portions of stroke 302, the processor may search for a first cell 306 to be scanned that represents a portion of stroke 302. In accordance with these embodiments, the processor may search for cell 306 by scanning each row of matrix 304 horizontally starting from a lower left corner of matrix 304. It should be understood by a person skilled in the art, however, that the disclosure is not limited to scanning matrix 304 from lower left corner of matrix 304. Scanning of matrix 304 to search for a cell representing a portion of stroke 302 may be initiated from any portion of matrix 304 and proceed in horizontal, vertical, or diagonal direction. Further, the searched cell representing a portion of stroke 302 may not necessarily be a peripheral cell, i.e., a cell representing an end portion of stroke 302. This cell may also be a non-peripheral cell that represents a portion of stroke 302.

Once the processor has found cell 306 as a result of this search, the processor may determine one or more parameters associated with a portion of stroke 302 represented in cell 306. These parameters may include length and width of the portion of stroke 302 represented in cell 306. In some embodiments, the length and width of the portion may be computed in terms of number of pixels. For example, length of a portion of stroke 302 represented in cell 306 may be 500 pixels and its width may be 20 pixels. The parameters may further include an area covered by the portion of stroke 302 represented in cell 306 in terms of number of pixels. Further, the parameters may include a geometrical shape of a portion. For example, a shape of a portion of a stroke may be linear, a slight curve, semicircular curve etc. In addition, the parameters may include a degree of curve or linearity of the portion. This may be computed in terms of range of tangential angles at various sequential points on the portion with respect to a horizontal axis. For example, the angle of a curvilinear portion may range from 10° to 65° with respect to a horizontal axis. The parameters may also include coordinates of multiple points of the portion. The coordinates may be computed to determine a positioning of various points of the portion with respect to horizontal and vertical axis.

Once the processor determines the parameters associated with cell 306, the processor may scan the neighboring cells of cell 306 to search for a subsequent cell that represents a portion of stroke 302. In some embodiments, the neighboring cells of cell 306 may include a first layer of eight cells that are adjoining to cell 306 and enclose cell 306. These cells may include cell 308, cell 310, cell 312, cell 314, cell 316, cell 318, cell 320, and cell 322 that are adjacent to and enclose cell 306. As a result of this scan, the processor may determine that cell 310 represents a second portion of stroke 302. The processor then determines one or more of the discussed parameters associated with the second portion of stroke 302 that is represented in cell 310.

On determining these parameters, the processor may further scan the neighboring cells of cell 310 such as cell 324, cell 326, cell 328, cell 312, cell 314, cell 306, cell 322, and cell 308. As a result of this scan, the processor may determine that cell 326 represents a third portion of stroke 302. In some embodiments, the processor may determine based on this scanning the neighboring cells of cell 310 that both cell 326 and cell 306 represent a portion of stroke 302. In this case, the processor may ignore cell 306 because the parameters of the first portion represented in cell 306 have already been determined. Further, the processor may proceed to determine one or more of the discussed parameters associated with the third portion represented in cell 326. Further, the processor may scan the neighboring cells of cell 326 in a similar manner as cell 306 and cell 310 were scanned, to search for a subsequent cell 328 that represents a fourth portion of stroke 302. The processor may then determine one or parameters associated with a fourth portion represented in cell 328.

In further accordance with these embodiments, the processor may scan all cells that represent a portion of stroke 302 in a similar manner, as discussed. On determining one or more parameters associated with cell 330, the processor may scan the neighboring cells of cell 330 and determine there are no more cells that represent a portion of stroke 302. The processor may then stop scanning any more cells based on this determination.

In some embodiments, when the processor searches for a first cell that represents a portion of stroke 302, this first cell may not be a peripheral cell. Thus, a stroke 302 may extend in two directions with respect to this first cell. In this scenario, the processor may determine parameters associated with portions represented by cells randomly in one of the two directions, in which stroke 302 extends. Subsequently, the processor may determine parameters associated with portions represented in cells in the second direction in which the stroke extends, after determining the parameters associated with the cells in the first direction.

Figure 4A:
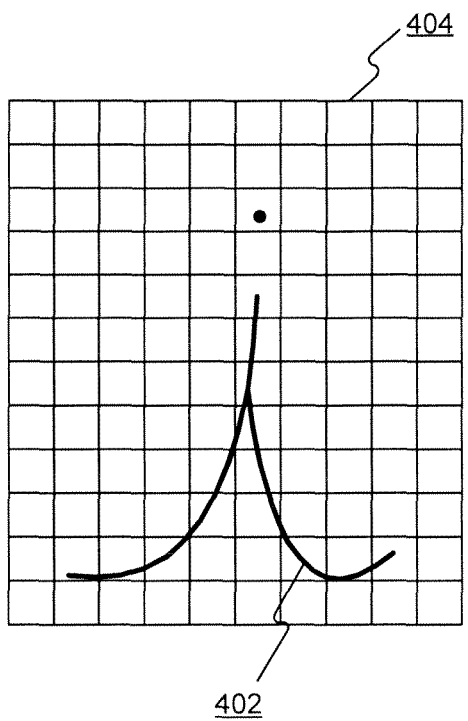
FIGS. 4(a)-4(c) illustrate an exemplary matrix representation of a second character and its strokes in accordance with some embodiments.
Figure 4B:
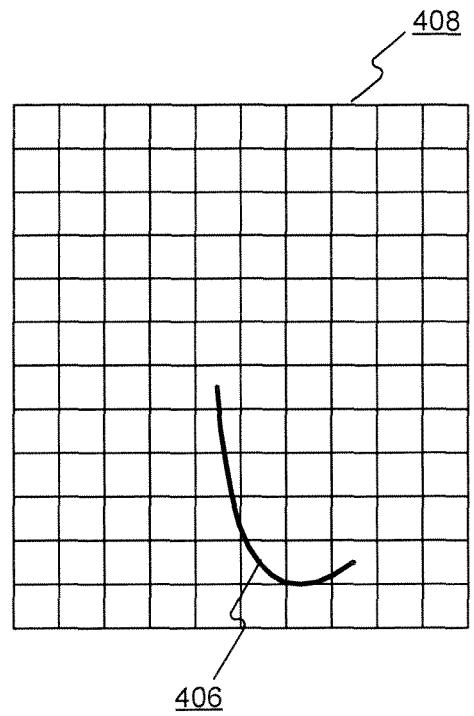
Figure 4C:
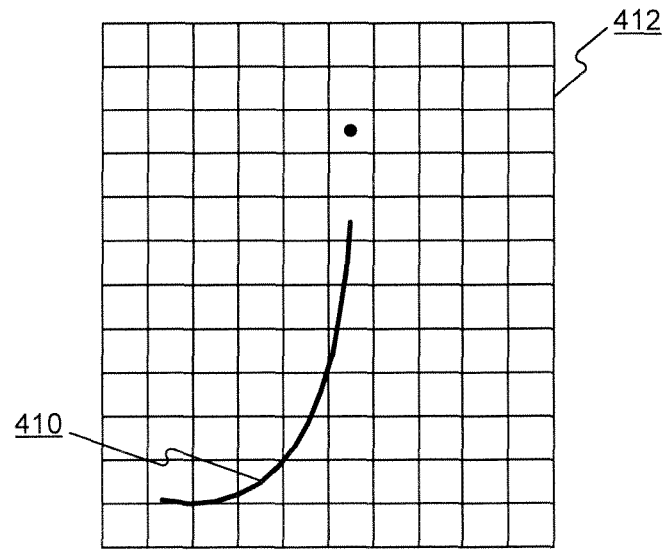

FIG. 4(a) illustrates another exemplary scenario in which a handwritten character 402 may be represented on a matrix 404. Here, character 402 may represent an English alphabet 'i' in a handwritten form. On receiving an image representing character 402, the processor may represent character 402 on matrix 404. The processor may then segment character 402 into two strokes in a similar manner as discussed in the context of FIG. 2(a). These strokes are illustrated in FIGS. 4(b) and 4(c). FIG. 4(b) may represent a first stroke 406 into which, character 402 of FIG. 4(a) may be segmented. Stroke 406 may be represented on a matrix 408. FIG. 4(c) illustrates a second stroke 410 into which character 402 of FIG. 4(a) may be segmented. Here, stroke 410 may be represented on a matrix 412.

Figure 5:
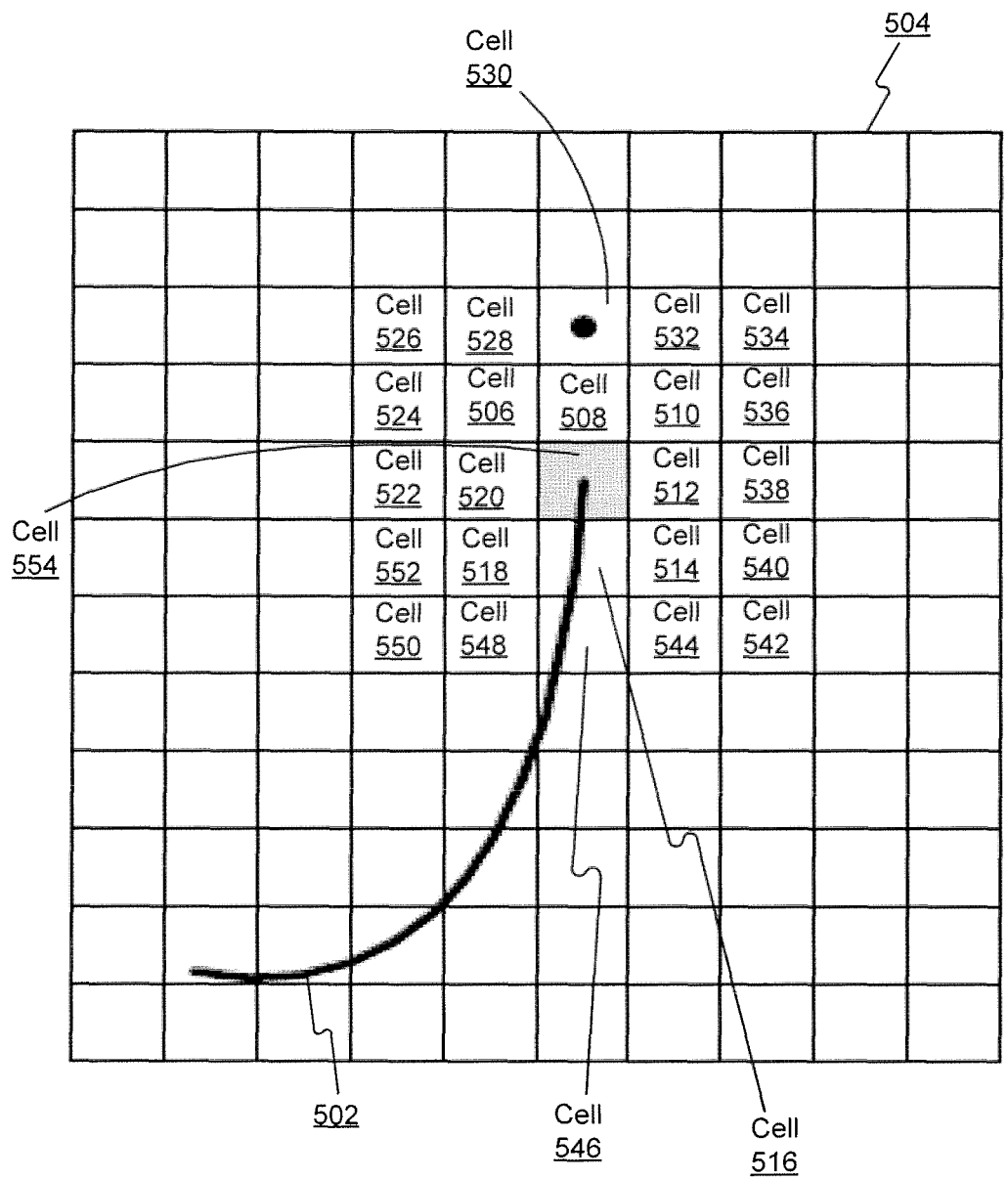
FIG. 5 illustrates an exemplary representation of scanned cells of a matrix in accordance with some embodiments.

FIG. 5 illustrates an exemplary stroke 502 that may be represented on a matrix 504 including a plurality of cells such as cell 506, cell 508, cell 510, cell 512, cell 514, cell 516, cell 518, cell 520, cell 522, cell 524, cell 526, cell 528, cell 530, cell 532, cell 534, cell 536, cell 538, cell 540, cell 542, cell 544, cell 546, cell 548, cell 550, cell 552, and cell 554 etc. Here, stroke 502 may be equivalent to stroke 410 of FIG. 4(c). The processor may determine one or more parameters associated with each cell such as cell 554 that represents a portion of stroke 502 by scanning all such cells sequentially in a similar pattern as explained in the context of FIG. 3.

In some embodiments, once the processor determines one or more parameters associated with a portion of stroke 502 represented in a cell, the processor may scan a first layer of eight adjacent cells to determine a subsequent cell that represents a portion of stroke 502. For example, on determining the parameters associated with a portion of stroke 502 represented in cell 554, the processor may scan a first layer of eight cells to search for a subsequent cell that represents a portion of stroke 502. Here, the processor may scan cell 506, cell 508, cell 510, cell 512, cell 514, cell 516, cell 518, and cell 520 that form a first layer of cells enclosing cell 554. In some embodiments, however, a second layer of cells that encloses the first layer of cells may also be scanned by the processor in addition to the first layer for greater accuracy. For example, in addition to the first layer of cells enclosing cell 554, the processor may also scan cell 522, cell 524, cell 526, cell 528, cell 530, cell 532, cell 534, cell 536, cell 538, cell 540, cell 542, cell 544, cell 546, cell 548, cell 550, and cell 552 that form a second layer of cells enclosing the first layer of cells. As a result of this scan, the processor may determine that cell 530 represents a portion of stroke 502. The processor may then determine one or more parameters associated with a portion of stroke 502 represented in cell 530 and proceed in a similar manner as discussed in the context of FIG. 3.

Here, in some embodiments, the processor may be configured by a user or a manufacturer either to scan the first layer, to scan both the first and the second layers, or more than two layers of adjacent cells.

On determining the parameters associated with each cell that represents a portion of a first stroke, the processor may aggregate all the parameters from all the portions represented by various cells to determine a set of first parameters associated with the first stroke. In some embodiments, the set of first parameters may include a total length and an average width of a stroke based on parameters from each cell representing a portion of the stroke. Further, the aggregated parameters may include a sequential range of tangential angles associated with multiple points of the stroke. In addition, the aggregated parameters may include determining an overall geometric shape of the stroke based on shapes of various portions represented in multiple cells. Optionally, the aggregated parameters may also include a relative positioning of a stroke with respect to another stroke if the parameters associated with the other stroke have already been determined. This relative positioning may be computed based on comparing the coordinates of various portions of both the strokes. The processor may determine a set of first parameters for each stroke associated with a character in a similar manner.

In keeping with an example illustrated in FIG. 3, the processor may determine one or parameters associated a portion of stroke 302 represented in cell 306, cell 310, cell 326, cell 328, and so on until one or more parameters associated with a portion of stroke 302 represented in cell 330 are determined. Once the parameters for all these cells are determined, the processor may aggregate all these parameters to determine a set of first parameters associated with stroke 302. Similarly, the processor may also determine a set of first parameters for other strokes such as those shown in FIGS. 2(c) and 2(d) into which the image of character 'A' was segmented by the processor.

Referring back to FIG. 1, in step 110, the set of first parameters for each of the one or more first strokes are then compared with a plurality of stored sets of second parameters associated with that stroke. Here, each of a plurality of stored second strokes is associated with a set of second parameters.

In some embodiments, once a set of first parameters associated with a first stroke is determined, the processor may compare the set of first parameters with multiple sets of second parameters that are stored in a memory of the electronic device. In some embodiments, these sets of second parameters may be stored in the memory by a manufacturer, for example, by storing a large number of sample strokes of each character in various handwriting styles at the time of manufacturing the electronic device. In some embodiments, the electronic device may also dynamically learn these parameters over a period of time by determining parameters associated with various strokes of handwritten characters. Here, values of the stored sets of second parameters may be considered as reference values for the comparison. The comparison may be done to find a set of second parameters that is a most relevant match to the set of first parameters among all the stored sets of second parameters.

In an exemplary scenario, a plurality of sets of second parameters, each set associated with a stored second stroke, may be stored in the memory of the electronic device. Various combinations of these sets of second parameters may be classified by different handwriting styles and stored with their associated characters as shown in mapping table 1 below.

MAPPING TABLE 1

| | | Mapping between characters and sets of second parameters | | | | | | | |
|---|---|---|---|---|---|---|---|---|---|
| Language | Character | Handwriting style 1 | | Handwriting style 2 | | | Handwriting style 3 | | |
| English | A | A1 | A2 | A3 | A4 | A5 | A6 | A7 | A8 |
| | B | B1 | B2 | B3 | B4 | B5 | B6 | B7 | B8 |
| | C | C1 | C2 | C3 | C4 | C5 | C6 | C7 | C8 | C9 |
| | D | D1 | D2 | | D3 | D4 | | D5 | D6 | C9 |

Here, mapping table 1 illustrates characters 'A', 'B', 'C', and 'D' of English and each character is mapped to multiple sets of second parameters such as set A1, set A2, set A3 etc. Each of these sets includes one or more parameters associated with a stroke into which that character can be segmented.

Thus, each of these sets may individually represent a different stroke associated with the character. For example, handwritten character 'A' may be represented by three strokes respectively associated with set A1, set A2, and set A3 according to a handwriting style 1 of a first user. Similarly, handwritten character 'A' may be represented by two strokes respectively associated with set A4 and set A5 according to handwritten style 2 of a second user. Here, handwriting style 2 may represent A in a different manner than handwriting style 1 because of different handwriting styles of two users. Therefore, the processor, while storing these second parameters, may interpret the character to be including three strokes according to style 1 and two strokes according to style 2.

It should be apparent to a person skilled in the art that the disclosure is not limited to storing second parameters associated with the strokes of only English characters. The scope of this disclosure also includes storing second parameters associated with strokes of characters of various known languages, number systems, special characters, or symbols. It should further be apparent to a person skilled in the art that the number of stored second sets of parameters per handwriting style and the number of stored handwriting styles is not limited as illustrated here and can be more or less than this number.

In some embodiments, the processor may compare the set of first parameters associated with a first stroke with the stored sets of second parameters in mapping table 1, for example, to find a matching set of second parameters. Here, the processor may look for a set of second parameters whose values match with values of the set of first parameters among all the sets of second parameters. In some embodiments, the processor may look for a set of second parameters whose values match substantially with values of the set of first parameters.

In keeping with an example illustrated in FIG. 3, the processor may determine a set of first parameters for stroke 302 and any other stroke in which character 302 (alphabet 'A') is segmented. The processor may then compare this set of first parameters with each of the stored set of second parameters until a matching set of second parameters is found. While comparing, the processor may determine whether values of each of the parameters of the first set match exactly or substantially with a corresponding parameter of the second set. For example, the first set of parameters may include a length—500 pixels, width—20 pixels, an angle range—50° to 60°. A substantially matching second set of parameters may include length—495 pixels, width—20 pixels, and an angle range of 49°-61°.

In step 112, the processor may identify a second stroke, from among the plurality of stored second strokes, for each of the one or more first strokes based on the comparison. Here, on determining a matching stored set of second parameters for a set of first parameters for a first stroke, the processor may determine a second stroke that is associated with the matching stored set of second parameters. The processor may do so based on a stored mapping table 2 that represents a mapping between the stored sets of second parameters and their associated second strokes. Mapping table 2 may be created and stored by a manufacturer while storing various sets of second parameters as represented in mapping table 1. In some embodiments, mapping table 2 may also be updated over a period of time while storing any additional sets of second parameters in the memory of the electronic device.

MAPPING TABLE 2

Mapping between sets of parameters and strokes

| Set | Stroke ID | Stroke | Character |
|-----|-----------|--------|-----------|
| A1  | 1         | /      | A         |
| A2  | 2         | \      |           |
| A3  | 3         | —      |           |
| B1  | 4         | \|     | B         |
| B2  | 5         | ⊃      |           |
| B3  | 6         | ⊃      |           |

In some embodiments, the processor may identify a second stroke from a plurality of strokes stored in mapping table 2. On determining a matching set of second parameters, the processor may, based on mapping table 2, map that set of second parameters to a stroke ID. A stroke ID may be binary value or an Ascii value that is associated to a second stroke by the processor. The processor may then identify a second stroke by mapping the stroke ID to a stored second stroke.

In keeping with the example illustrated in FIG. 3, the processor, based on the comparison of the set of first parameters associated with stroke 502 to the stored set of second parameters may determine set A1 to be a matching set of second parameters. The processor may then look for a stroke associated with set A1 and identify a stroke '/' that is associated with set A1. The processor may also identify a second stroke for each of the first strokes in a similar manner. Here, the processor may also identify stroke '\' based on a set of first parameters associated with stroke 224 of FIG. 2(c) and stroke '-' based on a set of first parameters associated with stroke 230 of FIG. 2(d).

In step 114, the processor may identify the character based on the identified one or more second strokes. Here, the processor may determine based on mapping table 2 a character that is associated with the identified second strokes. In further keeping with the previous example, the processor may look up the mapping table 2 and determine that the combination of the identified strokes '/', '\', and '-', are mapped to a character 'A.' In some embodiments, the processor may determine this mapping by determining a mapping between the stroke IDs of the identified strokes and a character ID that is further mapped to the character. Here, the character ID may be binary value that is associated to the character by the processor.

Figure 6:
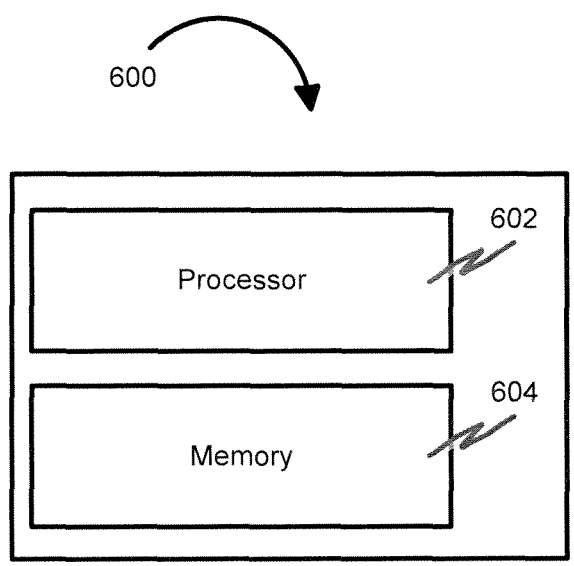
FIG. 6 illustrates a block diagram of a character recognition device in accordance with some embodiments.

FIG. 6 illustrates a block diagram of character recognition device such as an electronic device 600 in accordance with some embodiments. Electronic device 600 may include a processor 602 and a memory 604. In some embodiments, electronic device 600 may include a mobile device, a touch screen device, a tablet, a personal digital assistant, a laptop, a touch pad, a desktop workstation, or a scanner. It should be understood, however, that electronic device 600 is not limited to these devices and may include any computing device which can capture or receive an image of a handwritten text and process it further to recognize the handwritten text.

Electronic device 600 may receive an image representing one or more handwritten characters, each character including one or more first strokes. On receiving the image, processor 602 may preprocess the image. The preprocessing may include digitization of the image, removing noise from the image, and one or more of cropping, resizing, or transformation of the image. Further, processor 602 may segment the image into the one or more first strokes. Processor 602 may then determine a set of first parameters associated with each of the one or more first strokes. These parameters may include one or more of length of a stroke, width of a stroke, a geometrical shape of the stroke, a degree of curve of a stroke, coordinates of multiple points on a stroke, and relative positioning of a stroke with respect to another stroke.

Further, for each of the one or more first strokes, processor 602 may compare the associated set of first parameters with a plurality of stored sets of second parameters. The plurality of stored sets of parameters may be stored in memory 604. Here, each of a plurality of second strokes stored in memory 604 may be associated with a stored set of second parameters from the plurality of stored sets of second parameters.

Processor 602 may then identify a second stroke from the plurality of second strokes stored in memory 604 based on the comparison. Processor 602 may identify a second stroke corresponding to each of the one or more first strokes based on their associated comparisons. Once processor 602 identifies a second stroke corresponding to each of the one or more first strokes associated with a character, processor 602 may then identify the character based on one or more of the identified second strokes.

The specification has described offline handwriting recognition. Because the specification discloses identifying a stroke by determining a set of parameters for a stroke by scanning multiple granular portions of that stroke, there is a higher probability than prior art that a stroke can be correctly identified. Further, by storing sample strokes associated with a huge number of handwriting styles and comparing the set of first parameters with these samples, a character can be correctly identified in spite of having been written in any of varied handwriting styles. In addition, the disclosure also makes it convenient and more accurate to identify similar, but not the same, characters from different languages because each stroke is identified by analyzing multiple granular portions of that stroke.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for character recognition, the method comprising:
   receiving, by a character recognition device, an image representing a character, wherein the received image is segmented into one or more first strokes by splitting the represented character at one or more points that represent a sudden change of angle in the represented character;
   determining, by the character recognition device, a set of first parameters associated with each of segmented the one or more first strokes;
   comparing, by the character recognition device, for each of the one or more first strokes, the associated set of first parameters with a plurality of stored sets of second parameters, wherein each of the plurality of stored second strokes is associated with the plurality of stored set of second parameters;
   identifying, by the character recognition device, a second stroke, from among the plurality of stored second strokes, corresponding to each of the one or more first strokes based on the comparison; and
   identifying, by the character recognition device, the character based on the identified one or more second strokes.

2. The method of claim 1, further comprising representing, by the character recognition device, the received image in a matrix format comprising a plurality of cells.

3. The method of claim 2, wherein determining the set of first parameters further comprises scanning, by the character recognition device, the plurality of cells to determine, for each of the one or more first strokes, a first cell associated therewith.

4. The method of claim 3, wherein determining the set of first parameters further comprises:
   selecting, by the character recognition device, for each of the one or more first strokes, the associated first cell to determine, for each of the one or more first strokes, a set of third parameters; and
   selecting, by the character recognition device, for each of the one or more first strokes, a second cell associated therewith to determine, for each of the one or more second strokes, a set of fourth parameters, wherein selecting the second cell is based on selecting the first cell.

5. The method of claim 4, wherein selecting the second cell further comprises:
   scanning, by the character recognition device, a predetermined number of cells from the plurality of cells adjacent to the first cell;
   determining, by the character recognition device, that the second cell is associated with the corresponding first stroke based on the scanning; and
   selecting, by the character recognition device, the second cell based on the determination.

6. The method of claim 4, wherein determining the set of first parameters for each of the one or more first strokes further comprises aggregating, by the character recognition device, the corresponding set of third parameters and the set of fourth parameters.

7. The method of claim 5, wherein the second cell is determined to be associated with the corresponding first stroke when the first stroke extends into the second cell.

8. A character recognition device comprising:
   at least one processor; and
   a memory coupled to the at least one processor which are configured to execute programmed instructions stored in the memory comprising:
   receiving an image representing a character, wherein the received image is segmented into one or more first strokes by splitting the represented character at one or more points that represent a sudden change of angle in the represented character;
   determining a set of first parameters associated with each of segmented the one or more first strokes;
   comparing for each of the one or more first strokes, the associated set of first parameters with a plurality of stored sets of second parameters, wherein each of the plurality of stored second strokes is associated with the plurality of stored set of second parameters;
   identifying a second stroke, from among the plurality of stored second strokes, corresponding to each of the one or more first strokes based on the comparison; and
   identifying the character based on the identified one or more second strokes.

9. The device of claim 8, wherein the at least one processor is further configured to execute programmed instructions stored in the memory further comprising representing the received image in a matrix format comprising a plurality of cells.

10. The device of claim 9, wherein the at least one processor is further configured to execute programmed instructions stored in the memory for the determining the set of first parameters further comprises, scanning the plurality of cells to determine, for each of the one or more first strokes, a first cell associated therewith.

11. The device of claim 10, wherein the at least one processor is further configured to execute programmed instructions stored in the memory for the determining the set of first parameters further comprises:
   selecting for each of the one or more first strokes, the associated first cell to determine, for each of the one or more first strokes, a set of third parameters; and
   selecting for each of the one or more first strokes, a second cell associated therewith to determine, for each of the one or more second strokes, a set of fourth parameters, wherein selecting the second cell is based on selecting the first cell.

12. The device of claim 11, wherein the at least one processor is further configured to execute programmed instructions stored in the memory for the selecting the second cell further comprises:
   scanning a predetermined number of cells from the plurality of cells adjacent to the first cell;
   determining that the second cell is associated with the corresponding first stroke based on the scanning; and
   selecting the second cell based on the determination.

13. The device of claim 11, wherein the at least one processor is further configured to execute programmed instructions stored in the memory for the determining the set of first parameters for each of the one or more first strokes further comprises aggregating the corresponding set of third parameters and the set of fourth parameters.

14. The device of claim 13, wherein the second cell is determined to be associated with the corresponding first stroke when the first stroke extends into the second cell.

15. A non-transitory computer readable medium storing instructions that, when executed by at least one processor, cause the at least one processor to perform steps comprising:
   receiving an image representing a character, wherein the received image is segmented into one or more first strokes by splitting the represented character at one or more points that represent a sudden change of angle in the represented character;
   determining a set of first parameters associated with each of segmented the one or more first strokes;
   comparing for each of the one or more first strokes, the associated set of first parameters with a plurality of stored sets of second parameters, wherein each of the plurality of stored second strokes is associated with the plurality of stored set of second parameters;
   identifying a second stroke, from among the plurality of stored second strokes, corresponding to each of the one or more first strokes based on the comparison; and
   identifying the character based on the identified one or more second strokes.

16. The medium of claim 15 further comprising representing the received image in a matrix format comprising a plurality of cells.

17. The medium of claim 16, wherein the determining the set of first parameters further comprises, scanning the plurality of cells to determine, for each of the one or more first strokes, a first cell associated therewith.

18. The medium of claim 17, wherein the determining the set of first parameters further comprises:
   selecting for each of the one or more first strokes, the associated first cell to determine, for each of the one or more first strokes, a set of third parameters; and
   selecting for each of the one or more first strokes, a second cell associated therewith to determine, for each of the one or more second strokes, a set of fourth parameters, wherein selecting the second cell is based on selecting the first cell.

19. The medium of claim 18, wherein the selecting the second cell further comprises:
   scanning a predetermined number of cells from the plurality of cells adjacent to the first cell;
   determining that the second cell is associated with the corresponding first stroke based on the scanning; and
   selecting the second cell based on the determination.

20. The medium of claim 18, wherein the determining the set of first parameters for each of the one or more first strokes further comprises aggregating the corresponding set of third parameters and the set of fourth parameters.

21. The medium of claim 20, wherein the second cell is determined to be associated with the corresponding first stroke when the first stroke extends into the second cell.

* * * * *